United States Patent [19]
Quittner

[11] 3,751,667
[45] Aug. 7, 1973

[54] RADIATION PATH CONTINUITY TRANSDUCER OF HIGH PASS FREQUENCY

[76] Inventor: George F. Quittner, 1780 Cumberland Rd., Cleveland, Ohio 44118

[22] Filed: Aug. 10, 1971

[21] Appl. No.: 170,570

Related U.S. Application Data

[63] Continuation-in-part of Ser. No. 873,154, Nov. 3, 1969, abandoned.

[52] U.S. Cl. .............................. 250/351, 250/372, 250/211 J, 250/214
[51] Int. Cl. ............................................. G01j 3/00
[58] Field of Search ................ 250/83.3 H, 211 J, 250/214, 83.3 R

[56] References Cited
UNITED STATES PATENTS

| | | | |
|---|---|---|---|
| 2,967,279 | 1/1961 | Beck | 250/211 J X |
| 3,316,404 | 4/1967 | Cruse | 250/83.3 H |
| 3,436,540 | 4/1969 | Lamorlette | 250/83.3 H |
| 3,523,189 | 8/1970 | Hansen et al. | 250/211 J |

*Primary Examiner*—Archie R. Borchelt
*Attorney*—Woodling, Krost, Granger & Rust

[57] ABSTRACT

A signal is generated at a frequency substantially higher than powerline frequency and used to modulate a radiation emitting device. A radiation responsive device detects the modulated radiation together with any ambient radiation from other sources. AC coupling removes any unmodulated component from the output of the radiation responsive device, and high pass filtering greatly attenuates any components of the signal at the first harmonic of power line frequency and lower. Those frequencies which are substantially higher than powerline first harmonic are amplified and detected, and are utilized to signal whether or not the modulated radiation path is or is not interrupted. Provisions are disclosed to decrease the possibility that ambient radiation, not from the specially modulated source, will saturate the detector and amplifier system.

15 Claims, 4 Drawing Figures

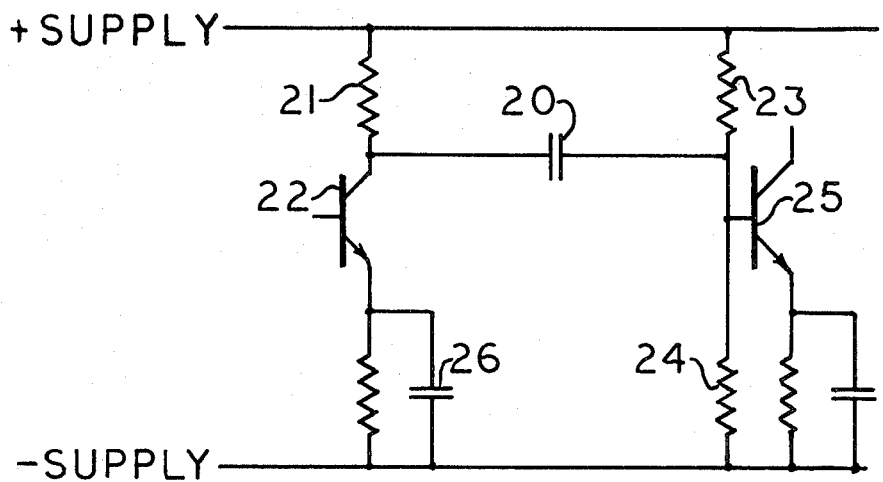
FIG.3 (OLD ART)
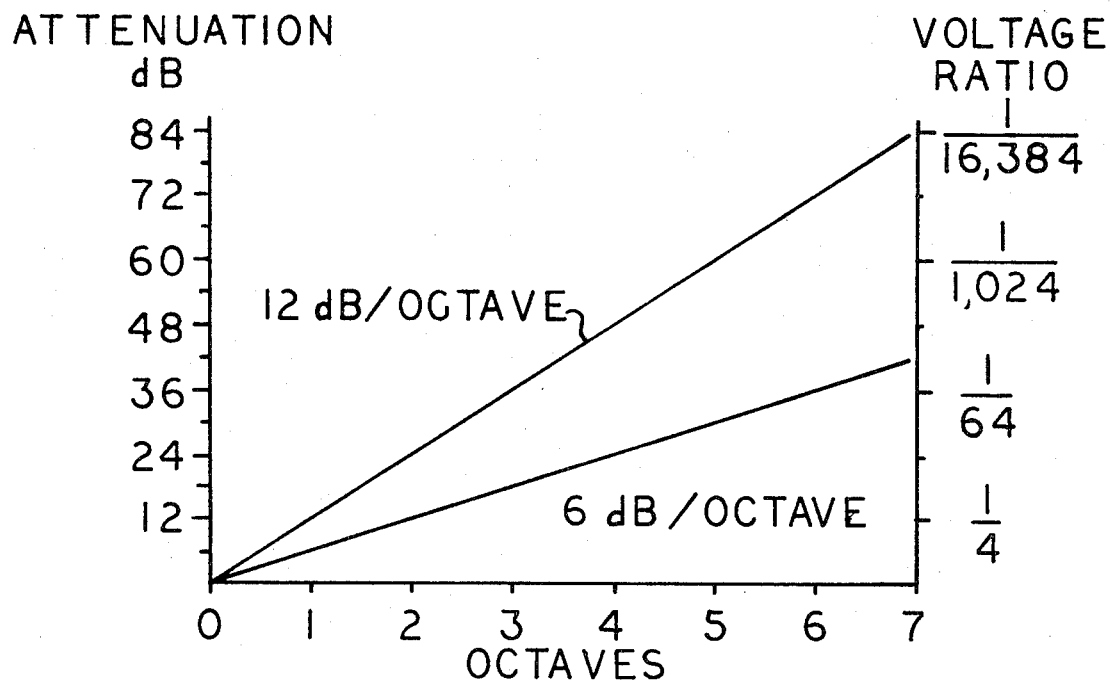
FIG. 4

RADIATION PATH CONTINUITY TRANSDUCER OF HIGH PASS FREQUENCY

RELATED APPLICATIONS

This application is a continuation-in-part of my application Ser. No. 873,154, filed Nov. 3, 1969, now abandoned.

BACKGROUND OF THE INVENTION

The present invention relates to radiation path continuity transducers, particularly to those using photoelectric responsive means, and specifically to those whose output signals are relatively undisturbed by radiation from sources other than a selected source. Applications for such transducers are very common for counting discrete objects passing on a conveyor, automatically positioning a machine tool member or part to be worked with a machine, inspecting parts for size accuracy, and the like.

In many applications, very simple and inexpensive photoelectric transducers suffice because of the noncritical nature of the task and situation. My invention is advantageous where the application requires very high reliability, minimum maintenance and adjustment, and superior precision. For example, a high productivity, computer controlled automated production line may involve perhaps 50 workers integrated with several hundred program steps, and any production delay due to an unreliable transducer would be very expensive compared to the cost of the transducer.

It has been previously proposed to make photoelectric transducers insensitive to radiation other than that from a particular source by intensity modulating the radiant beam mechanically and other ways, and by demodulating the detected signal using narrow band filters and/or synchronous demodulators. Narrow band radiation filters may be used ahead of the radiation detector. Such schemes, however, have been commercially unsuccessful because the apparatus was bulky, complex and expensive, and particularly because it was difficult to keep it adjusted operably. For example, chopper discs would vary in speed due to varying friction and no longer match the demodulator adjustment or the narrow band tuned electrical filter would change center frequency due to ambient temperature change and decrease the sensitivity of the system, or the synchronous demodulator would become unbalanced due to temperature change and/or component aging and produce a steady DC output voltage even in the absence of the desired modulated signal. Intensity modulated radiation beams have been proposed and/or used for various purposes, other than for signaling position of objects which interrupt the radiation path in order to permit the utilization signal to be unresponsive to radiation from a specific source. For example, facsimile transmitters utilize radiation which is intensity modulated by the picture being transmitted, but in this case radiation from other sources than the selected one provided can easily be eliminated by total enclosure and suitable optical design (which I cannot do because the purpose of my invention is to work on machinery and parts moving outside any enclosure I can provide), the beam sources need not be intensity modulated (which, in any case would interfere with the broad bandwidth information being scanned), and the signal to be utilized represents the varying reflectivity or transmissibility of a graphic image in a single plane as distinguished from the position of a beam obscuring object which may be located at any or varying locations along the radiation path. Somewhat similarly, a television sensing apparatus of the flying spot type may utilize a position modulated, constant intensity, beam of radiation, but here again the function of the modulation and the consequent design of the sensing apparatus are quite different from mine of signaling the position of an object in the presence of radiation from sources other than a selected one. In general, even the use of source intensity modulated beams, such as line frequency modulated X-rays, pulsed lasers (to shorten the duty cycle), common mercury vapor fluorescent lamps (which are modulated because the line current passes through zero twice per cycle) and so on, does not employ the source intensity modulation for the same purpose as I do, does not employ an equivalent radiation responsive apparatus (if any at all), and in general these are modulated for different purposes, utilize different apparatus and do not function to signal the obscuration of the beam path from a selected source while disregarding the radiation from other sources.

It is therefore an object of my invention to provide simple, inexpensive apparatus having improved reliability, reduced maintenance and adjustment and reduced operating indeterminacy.

SUMMARY OF THE INVENTION

The invention may be incorporated in a radiation responsive system, the combination of, radiation responsive means, source means to emit radiation along an interruptable path to said radiation responsive means, means for modulating the radiation source means at a modulation frequency in a high pass frequency and higher than power line frequency, and utilization means connected to said radiation responsive means for selecting and responding only to the frequencies of said high pass frequency and to indicate the presence or absence of a continuous radiation path between said radiation emitting and responsive means.

Other objects and a fuller understanding of the invention may be had by referring to the following description and claims, taken in conjunction with the accompanying drawing.

BRIEF DESCRIPTION OF THE DRAWINGS

FIG. 3 shows the schematic diagram of an (old art) capacitive coupling stage; and, FIG. 4 shows the attenuation characteristics graphically for low frequencies as compared with higher frequencies, when both are passed through one, and also through two, stages of high pass capacitive AC coupling.

DESCRIPTION OF THE PREFERRED EMBODIMENT

Figures 1, 2:
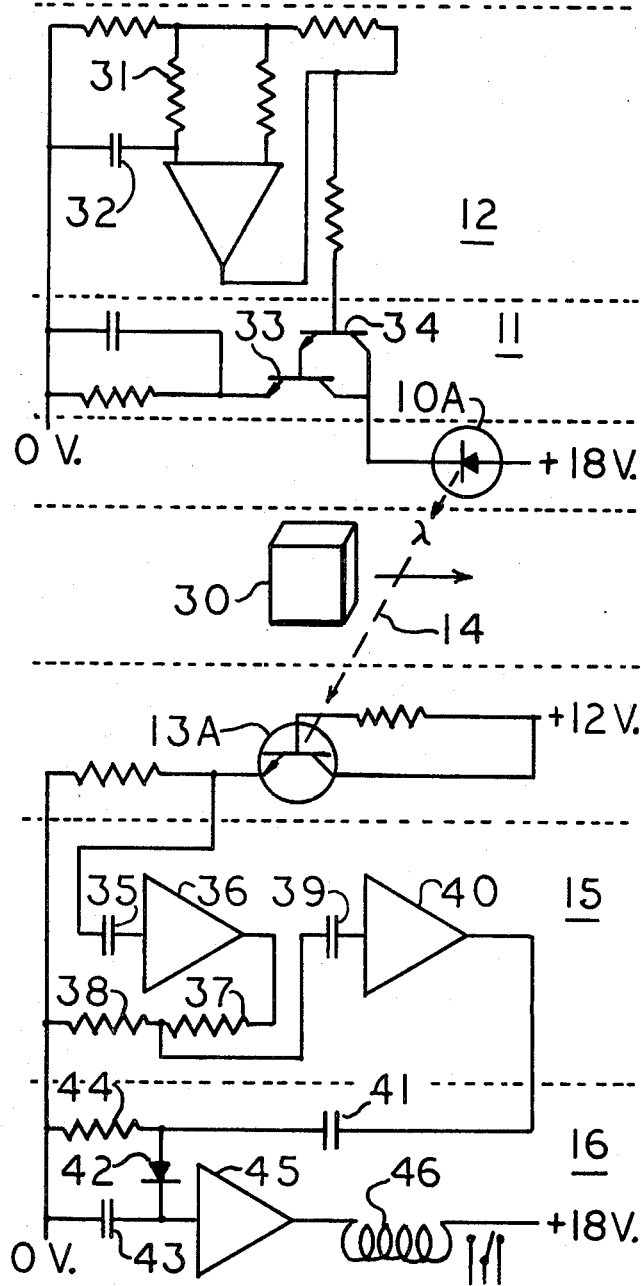
FIG. 1 is a schematic diagram showing the basic signal processing steps of my invention.
FIG. 2 is a more completely detailed practical schematic diagram of a circuit which may be utilized to practice my invention.

Referring now to FIG. 1, a modulatable radiation source 10 is modulated by modulating means 11, which is provided with a modulating signal at substantially higher than line frequency by a source 12. The radiation source 10 and a radiation responsive means 13 share a radiation path 14 by means of which radiation proceeds from radiation source 10 to radiation responsive means 13. An AC coupling (and thereby, DC signal removing), high frequency passing (and thereby, low frequency attenuating), and amplifying means 15 accepts the electrical response of radiation responsive means 13, and passes the high frequencies (which have originated in signal source 12) on to utilization means 16.

In operation, radiation from source 10, traveling along path 14, is substantially continuously modulated according to the signal generated in signal source 12, by modulating means 11. Radiation from source 10, *and* radiation from any other chance located sources (hereinafter called "ambient radiation"), arrive together at radiation responsive means 13. The response is an electrical signal containing components representative of the arriving radiation of wavelengths and modulation frequencies to which the responsive means 13 is sensitive.

I have discovered that almost all natural and man-made sources of radiation in the near infrared, visible and near ultraviolet range of wavelengths to which radiation responsive means 13 is preferrably selected to be responsive, are either substantially unmodulated (this particularly includes sunlight, most of the radiation from incandescent illuminating devices, and radiant energy from sources which are hot and only coincidentally radiative such as hot flames and heater metal pieces and/or streams), or modulated at very low frequencies (including sunlight modulated by passing clouds, persons, industrial trucks and the like, flickering flames, shimmering streams of hot metal, etc.), or modulated at line frequency or its first harmonic (including electrical vapor arc sources such as common fluorescent and "neon" lights, AC carbon arcs, welding arcs, and a small percentage of the radiation from incandescent lamps). The electrical signals from radiation responsive means 13 therefore contain not only components from selected source 10, but also from ambient sources at DC, near DC, line frequency and the first harmonic of line frequency. AC coupling, high pass filtering and amplifying means 15 thus removes all the components of the electrical signal due to ambient sources and amplifies those components which are at relatively high frequencies to useful levels for the utilization means 16, these being the components coming from selected source 10. In operation, the useful information provided reliably to the utilization means 16 arises from interruption of the radiation path 14 by parts or tools or mechanisms whose position is interpreted by utilization means 16 according to the level of relatively high frequency signal received. To the extent that ambient radiation enters and produces electrical signals from radiation responsive means 13, those signals are irrelevant and deleterious to consistent, reliable operation, so their removal by AC coupling, high pass filtering and amplifying means 15 is critical to the successful operation of my invention.

As is well understood by those familiar with the art of AC amplification, the AC coupling of signal between radiation responsive means 13 and the amplifying portions of the AC coupling, high pass filtering and amplifying means 15 is usually and conventionally carried out by means of either transformer coupling or resistor-capacitor coupling (shortened to "capacitive coupling" hereinafter) or such closely related and combination methods as choke-capacitor and transformer-capacitor coupling. Since capacitive coupling is the least costly, least space consuming, and has the least mass, other coupling methods will not be further discussed here, even though they may be usefully employed in practicing my invention in certain cases. I wish to be limited only by the appended claims.

Since radiation source 10 may be quite weak, radiation path 14 may be relatively long, and radiation responsive means 13 may be relatively insensitive as compared with other possible sensors having certain size or cost or other technical disadvantages, the degree of amplification required of means 15 to practice my invention may be quite high, such as 50 or even 100 db. To provide this degree of amplification generally requires several stages of active amplifiers. While some of these stages may be DC coupled to one another (particularly when integrated circuit amplifiers are used), it is useful and conventional to couple at least some of them by AC (capacitive) coupling, which of course narrows the bandwidth capabilities of the overall amplifier at the near DC end of the band. Such conventional AC coupling may, however, be distinguished from "high pass filtering" by the value of capacitors selected for coupling (assuming like input and output impedances facing the capacitor) and the task (defined by gain and bandwidth) the amplifier is required to perform.

Referring to FIG. 3, coupling capacitor 20 between a certain pair of sequential amplifying stages would have its input impedance for low and moderate AC frequencies such as 0.1 to 100 KHz primarily determined by the output load resistor 21 and the impedance due to active device 22 characteristics and its bias adjustment, and its output impedance primarily determined by the values of bias resistors 23 and 24, active devices 25 and bypass capacitor 26. For a given set of these output and input impedances, the value of capacitor 20 selected can affect the coupling characteristics in well understood ways. As the value is made larger, lower and lower frequencies may be passed but DC is nevertheless blocked in all cases. For a selected value of capacitance, the amplitude of signals passed will increase at approximately 6 db per octave of frequency change up to a frequency called the "corner frequency" at which the impedance of the capacitor itself equals the input impedance of the succeeding stage. For frequencies substantially higher (such as an octave or more) than the corner frequency, the signals will be passed at substantially equal amplitudes regardless of frequency. Thus, signals at frequencies which are several octaves *lower* than corner frequency will be attenuated with respect to signals nearer corner frequency. For particular applications, of which my invention is an example, it is desirable to choose the coupling capacitor value small enough so that certain signal frequencies, in this case line frequency and its first harmonic, are well below the corner frequency. Thus, in this case, the AC coupling (which cannot be distinguished merely from the appearance of the schematic diagram without considering the parts, values and the functional purposes of the amplifier) becomes a "high pass filter" (which is, equivalently, a low frequency attentuating filter).

In practicing my invention, the above considerations are critical in achieving one of my most important objectives, insensitivity to ambient radiation sources. In addition to rejecting the DC and low frequencies of modulation of ambient sources, these low frequencies must not be amplified enough to saturate later amplifier stages, because in that case they would be unable to amplify the high frequency signals from the modulated source 10 of the invention. At the same time, the ambient radiation may, under some conditions, produce many times as large an electrical signal at the output of the radiation responsive means 13 as the desired signal.

As an illustrative example, consider that a preferred radiation source for practicing my invention is an infrared emitting diode with a total radiation output of 5 milliwatts, focused by a lens to form a 10° cone of radiation. Using as my preferred radiation responsive means a phototransistor having only a one-eighth inch diameter aperture, positioned at a distance of 3 feet along the sensing radiation path 14, this aperture subtends a conical angle of approximately 11 minutes of arc. Since the radiation received is proportional to the rear of the aperture, the radiation received from the selected source is approximately $8 \times 10^{-3}$ milliwatts.

By way of comparison to this, consider a fluorescent lamp as an ambient source of twice-line-frequency modulated radiation. If the lamp radiates 100 watts, 100 percent modulated, in front of a reflector permitting 180° conical angle dispersion, at a distance of 10 feet from the one-eighth inch aperture of the phototransistor, it may be estimated that arriving energy, with a conical angle of 3½ minutes of arc is approximately $3.3 \times 10^{-4}$ milliwatts.

Since one would like to reduce the effect of this ambient radiation to negligible amplitude at the utilization means, for example 0.1 percent of the desired signal, one would, by electronic high pass filtering, have to reduce the signal to about one-fourtieth of the received amplitude. The conditions selected are by no means "worst case," so in actual design, a substantial safety factor would be used. A ratio of 1/100 would be marginal; a ratio of 1/1,000 would be far better.

The table below is calculated for the case where the coupling capacitor (for a certain surrounding circuit impedance condition) has been selected to produce a corner frequency at least seven octaves higher than the first harmonic of line frequency. Under the Frequency column is shown the beginning of the series of harmonics above the first harmonic of line frequency. Under the Octaves Frequency Change column is shown how many octaves above the first harmonic of line frequency is the frequency shown on the same horizontal line, to the left. On the right-hand side of the table, two columns are listed under Voltage Ratio. One of these columns shows the ratio of attenuation of the first harmonic of line frequency with respect to the frequency horizontally located at the extreme left column for a single high pass stage ("6 db/octave") and the other the corresponding ratio for two high pass stages ("12 db/octave").

| Frequency | Octaves Frequency Change | Voltage Ratio 6 db/octave | | 6 12 db/octave | |
|---|---|---|---|---|---|
| 120 Hz | 0 | 1:1 | (0 db) | 1:1 | (0 db) |
| 240 Hz | 1 | 1:2 | (6 db) | 1:4 | (12 db) |
| 480 Hz | 2 | 1:4 | (12 db) | 1:16 | (24 db) |
| 960 Hz | 3 | 1:8 | (18 db) | 1:64 | (36 db) |
| 1,920 Hz | 4 | 1:16 | (24 db) | 1:256 | (48 db) |
| 3,840 Hz | 5 | 1:32 | (30 db) | 1:1,024 | (60 db) |
| 7,680 Hz | 6 | 1:64 | (36 db) | 1:4096 | (72 db) |
| 15,360 Hz | 7 | 1:128 | (42 db) | 1:16,384 | (84 db) |

Thus, if the signal source 12 were selected to oscillate at 15 KHz, the line frequency is 60 Hz and its first harmonic is 120 Hz, with a single capacitive high pass coupling the 120 Hz signal would be attenuated in the ratio 1:128 as compared with the signal frequency. With two capacitive high pass coupling stages the corresponding attenuation ratio would be 1:16,384.

FIG. 4 is a graph concisely showing these relationships, assuming the capacitor value in each case is selected so the corner frequency is seven octaves above the first harmonic of line frequency. The graph makes dramatically apparent the vast advantage of using two capacitive high pass filters. The cost of doing this is quite negligible since the coupling capacitors are generally *less* expensive in smaller values, and the added gain required is already available in the integrated circuit amplifiers I prefer to use.

FIG. 2 shows a schematic diagram of a preferred embodiment of my invention in sufficient detail to permit its practice by anyone skilled in the art. The figure is partitioned into several sections by dotted lines. These sections are marked with identifying numbers which correspond to like numbers in FIG. 1. Modulation source 12 is a square wave oscillator of well known configuration for integrated circuit amplifiers, in which resistor 31 and capacitor 32 are selected to produce a square wave modulating signal at a substantially constant frequency substantially higher than the first harmonic of line frequency. For example, if resistor 31 is 47 kilohms and capacitor 32 is 0.01 microfarad, the signal has a preferred frequency of approximately 20 KHz.

Modulating means 11 contains a power transistor 33 and a darlington connected current amplifying transistor 34 to modulate the current through light emitting diode 10a in response to the modulating signal received from modulating source 12. Light emitting diode 10a is a modulatable, radiation source whose output is modulated by the changes in current through it, controlled by transistor 33. The carrier from the radiation source 10a is thus visible light or infrared and the modulation thereof is at 20KHz, more than five octaves higher than the first harmonic 120 Hz of line frequency 60 Hz. The radiation produced by source 10a proceeds along path 14. An object 30 whose position is to be signaled (transduced) is located so that it will disturb the continuity of radiation path 14. Radiation proceeds, when not interrupted by an object whose interruption is to be signaled, to a phototransistor 13a, which, with its emitter load resistor and base biasing resistor comprises radiation responsive means 13.

The emitter follower arrangement of radiation responsive means 13 is conventional in circuit appearance, but I find it quite advantageous to use it here in a somewhat unusual way. Namely, I use a base biasing resistor which is exceptionally high in value, barely sufficient, in fact, to keep the phototransistor 13a conducting slightly more than its leakage current. When the biasing resistor is so selected, I find first that the apparent sensitivity of the phototransistor to radiation source 10a is enhanced. But most importantly, despite this sensitivity enhancement, I also find that the ease with which ambient radiation can turn the transistor fully on (saturate it) and thus make it incapable of demodulating modulated radiation from source 10a is *decreased*. Apparently this is because as ambient radiation input is increased, the emitter voltage increases due to increased collector current, and the current contribution from the biasing resistor becomes negligible due to the voltage of the base-emitter diode increasing. The phototransistor 13a demodulates the modulated carrier and the electrical signal output from the phototransistor 13a is connected to the input of AC coupling, high pass filtering and amplifying means 15. If unmodulated radiation, e.g., visible or infrared radiation, falls on the phototransistor 13a, then it has a DC output. This is the case for daylight or incandescent lamp light falling on the phototransistor. Now in this invention the radiation is modulated, e.g., at 20 KHz, and hence the output of the phototransistor is a DC with superimposed modulation frequency thereon. The DC is blocked by the capacitor 35 from passing to the succeeding stages. It is evident that within this means 15 the three descriptively separable functions of AC coupling and DC isolation, high pass filtering and low frequency attenuation, and amplification, may be carried out in various more or less interchangeable sequences and combinations without exceeding the scope of my invention. In this preferred embodiment the first capacitor 35 serves to provide AC coupling and DC isolation, and at the same time is selected to have the small value of 50 pf, which serves to provide high frequency coupling (high pass filtering) and low frequency attenuation, with a high passing characteristic of 6 db increase in voltage output per octave frequency change. An amplifier stage 36 is preferably an integrated circuit chip which raises the signal to usable levels. The output of amplifier 36 is loaded by a voltage divider comprising resistors 37 and 38. The purposes of the attenuator are (1) to provide a low impedance for the following capacitor 39 (second high pass filter) coupling stage, (2) to permit a suitable signal level to be chosen to prevent overloading of the input stage of the following amplifier 40, and (3) to permit standardization, in repetitive commercial production, of the output signal level of means 15 to compensate for variations and tolerances in various component characteristics. The capacitor 39 is a second AC coupling and high pass filtering capacitor, of e.g., 50 pf, and provides an additional 6 db/octave transfer characteristic slope for means 15. Capacitor 39 provides high frequency signal (at the frequency of modulating source 12) to the second amplifier stage 40. The AC output of amplifier 40 is composed, despite the input of ambient radiation from other sources than selected source 10a, of signal at the frequency of modulation of signal source 10a arriving via radiation path 14, and a certain amount of electrical noise, mostly originating in phototransistor 13a.

Utilization means 16 as drawn is only one of many possible utilization circuits, but will serve to exemplify the main requirements for utilizing the information in the signal output of means 15 regarding the degree of continuity of radiation path 14 and thereby the position of objects 30 which can interrupt that continuity. A capacitor 41 of relatively high value, such as 10 mfd., AC couples the signal into a peak voltage rectifier and smoothing circuit comprising rectifying diode 42, smoothing capacitor 43 and current return path resistor 44. This produces a variable DC voltage proportional to the intensity of modulated radiation received by phototransistor 13a along path 14 from selected radiation source 10a, plus a fixed DC voltage due to rectification of noise generated and amplified by the preceding circuits.

This variable DC signal is amplified by DC amplifier 45, whose input bias voltage level has been adjusted so that noise alone produces zero or nearly zero amplifier output voltage, while noise plus signal from source 10a produces sufficient voltage and current to close relay 46. The position changing of the contacts of relay 46 in response to variations in the continuity of radiation path 14 are the logical and power controlling intelligence, useful in counting, positioning and measuring uses to which my invention is directed.

The present invention achieves a radiation responsive system of superior precision because the light emitting diode 10a and the phototransistor 13a inherently have small cross-sections relative to radiation path 14. Each would require special added optics to provide the wide beams characteristic of filamentary sources and older types of photocells. A narrow beam of radiation and a narrow cone of receptivity make the system superior in precision because the projected shadow of a beam interrupting moving object causes a larger percentage change of the total aperture of the sensing phototransistor than if the aperture were larger. For example, in a circuit made in accordance with this invention, I have readily obtained relay switching consistently, despite substantial line voltage and ambient temperature change, over a range of only plus or minus 0.002 inches of beam breaking object position.

The present invention has the very advantageous characteristic that, unlike other photoelectric transducers, no sensitivity adjustment by the user is required. The chief reason why other photoelectric position transducers require such a user adjustment is that they are sensitive to ambient light, so that when a system is installed under certain ambient light conditions, the adjustment must be set so the system will switch at given beam-breaking object position, and when the ambient light changes that position will change unless the sensitivity adjustment is also altered manually to compensate. Since the present invention is insensitive to ambient light, the need for such adjustment is eliminated.

In summary, I provide a radiation beam modulated at a relatively high frequency and detection and utilization means responsive only to radiation so modulated and *not* tuned to any narrow or carefully specific passband, to achieve the objects set forth in the introduction.

It is evident that there are many equivalents available to provide the functions required by my invention, including transformer coupling of the signals between different circuits of sections 13, 15 and 16 of FIG. 3 with separated high pass filter circuits and the like, different modulating means than suggested here for modulating the radiation at a high frequency, which may be a varying or even modulated one itself for later decoding, and so on, but I intend to be limited only by the accompanying claims.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. In a radiation responsive system, the combination of,
    radiation responsive means,
    source means to emit radiation along an interruptable path to said radiation responsive means,
    means for modulating the radiation source means at a modulation frequency in a high pass frequency band higher than power line frequency,
    and utilization means including high frequency pass filter means connected to said radiation responsive means for selecting and responding only to the frequencies of said high pass frequency band to indicate the presence or absence of a continuous radiation path between said radiation emitting and responsive means.

2. A responsive system as set forth in claim 1, wherein said radiation responsive means is further characterized as being a photosensitive transistor connected as an emitter follower, whose base is electrically biased through a high impedance to a source of current.

3. A responsive system as set forth in claim 1, wherein said modulating means modulates the emission from said radiation emitting means.

4. A responsive system as set forth in claim 1, including means to interrupt the path between said emitting and responsive means whereby said utilization means indicates the presence or absence of said interrupting means in said path.

5. A responsive system as set forth in claim 1, wherein said utilization means includes high frequency pass filter means preceding any amplification means in said utilization means.

6. A responsive system as set forth in claim 1, wherein said utilization means includes load means having an increasingly lower impedance with increasing frequency to be responsive to the higher frequency modulation frequency.

7. A responsive system as set forth in claim 6, wherein said load means includes capacitor means passing the signal output of said utilization means to have a decreased impedance with increasing frequency.

8. A responsive system as set forth in claim 7, including means to amplify the output from said capacitor means,
    means to rectify the output from said amplifier means,
    and low pass filter means connected to the output of said rectifying means to indicate by a higher or lower voltage value of direct current the presence or absence of a continuous radiation path.

9. A responsive system as set forth in claim 8, including a switching transistor connected to the output of said low pass filter,
    and means connecting the output of said switching transistor to control a load.

10. A responsive system as set forth in claim 1, wherein said modulating means is separate from any interruptions along said path.

11. A radiation responsive system, comprising, in combination,
    a source of modulation signal having a frequency substantially higher than the first harmonic of line frequency,
    a modulatable radiation source,
    modulating means to said modulating signal and connected to modulate said modulatable radiation source,
    radiation responsive means,
    an interruptable radiation path between said radiation source and said radiation responsive means,
    means for selectively amplifying only signals substantially higher in frequency than the first harmonic of line frequency and connected to said radiation responsive means,
    and means for detecting and utilizing the amplitude of said higher in frequency than the first harmonic of line frequency signals to detect the interrupted or uninterrupted condition of said path.

12. A radiation responsive system as set forth in claim 11, wherein said selective amplifying means attenuates all signals lower in frequency than said modulating frequency at a rate of 6 db per octave change of frequency.

13. A radiation responsive system as set forth in claim 11, wherein said selective amplifying means attenuates all signals lower in frequency than said modulating frequency at a rate of 12 db per octave change of frequency.

14. A radiation responsive system as set forth in claim 11, wherein said modulation signal has a frequency at least five octaves higher than the first harmonic of line frequency.

15. A radiation responsive system as set forth in claim 11, wherein said modulation signal is a source of relatively constant frequency.

* * * * *